May 31, 1927.
J. D. JEFFERSON
POULTRY CATCHER
Filed Dec. 9, 1926
1,630,946
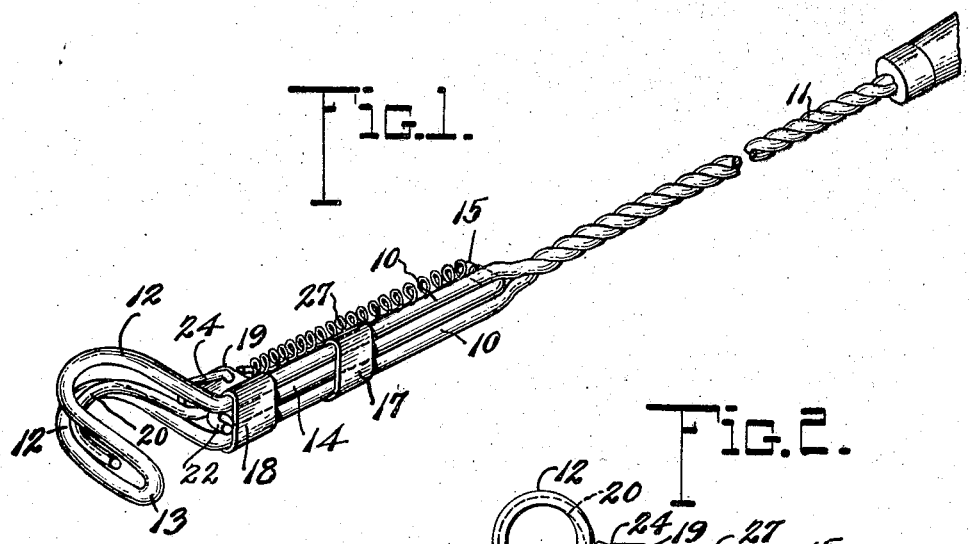
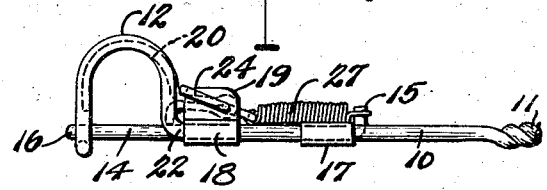
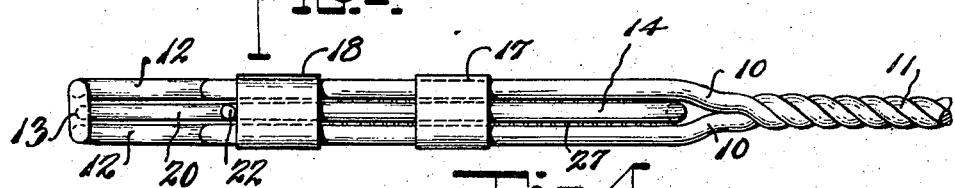
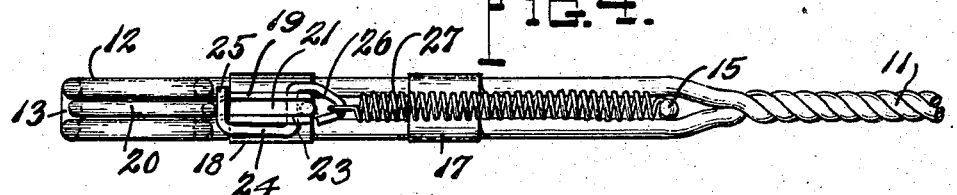
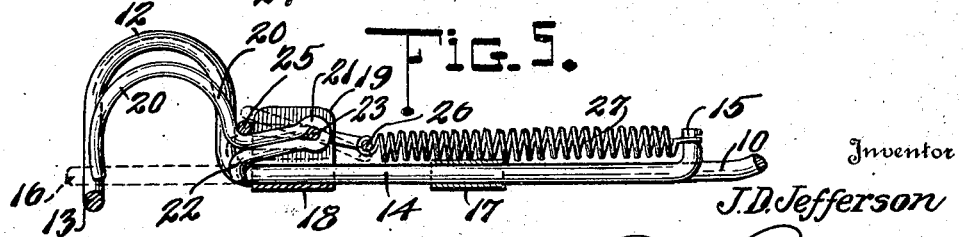
Inventor
J. D. Jefferson
By Robb & Robb
Attorneys Patented May 31, 1927.

1,630,946

UNITED STATES PATENT OFFICE.

JEROME D. JEFFERSON, OF FEDERALSBURG, MARYLAND, ASSIGNOR TO DEL-MAR-VA SALES COMPANY, OF LAUREL, DELAWARE.

POULTRY CATCHER.

Application filed December 9, 1926. Serial No. 153,635.

This invention relates to a poultry catcher, and particularly to a construction including a trigger operated latch for automatically closing the crook of the device. The invention presents a simple and efficient construction adapted to be economically formed from wire and carrying a sliding latch mounted upon the shank of the crook and disposed to lie between parallel wires forming the free end thereof so as to close the crook and prevent displacement of the latch by transverse pressure thereon incident to handling the fowl or animal caught.

It is further desirable to protect the trigger for such a latch by mounting the trigger member intermediate the parallel wires forming the crook and also tensioning the trigger conjointly with the latch by a single spring connected to these members which insures a joint operation thereof.

The invention has for an object to provide a novel and improved construction of catching device having a shank and crook with a latch and controlling trigger mounted thereon and connected by tension means for joint operation.

Another object of the invention is to present a construction of shank and crook formed of parallel wires with a sliding latch mounted between the wires of the shank to be projected across the open portion of the crook and a trigger disposed intermediate the wires of the crook portion to engage and hold said latch in open position.

A further object of the invention is to provide an improved construction including the shank and crook with the latch member slidingly mounted upon the shank and a trigger pivoted upon said shank and conforming to the shape of the crook with a finger adapted to be disposed in the path of the latch, together with a lever bearing on said trigger and a tension spring extending from said lever to the latch member.

Other and further objects and advantages of the invention will be hereinafter set forth and the novel features thereof defined by the appended claims.

In the accompanying drawings:—

Figure 1 is a perspective of the invention;

Figure 2 is a top plan of the parts as in Figure 1;

Figure 3 is a front elevation;

Figure 4 is a rear elevation; and

Figure 5 is a longitudinal section between the parallel wire members.

The invention is applicable to various uses and is herein shown as designed for a poultry catcher, but if used for catching animals the proportions of the parts may be suitably varied and the crook or hook portion properly designed to engage the leg of the fowl or animal to be caught.

In the present showing the shank 10 is composed of parallel wires which may be twisted at one end to provide an extended handle 11 of any desired length and bent transversely at the opposite end to form the crook 12, the free end 13 of which is produced by a rebending of the wire so as to provide the parallel members from a single strand of wire. This provides for the formation of an integral shank and crook from a single piece of material and so disposes the wires in spaced parallel relation as to support the remaining elements of the device as hereinafter described.

For the purpose of closing the crook after it has been engaged with the leg of an animal, a bolt member 14 is slidingly mounted intermediate the parallel wires 10 of the shank and formed at one end with a finger piece 15 while the free end 16 thereof is adapted to be projected between the wires forming the free end of the crook at 13 as shown in Figures 2 and 5. This prevents any displacement of the bolt by the outward movement such as is liable to occur when strain is applied in catching or holding the fowl or animal by the device.

For the purpose of retaining this bolt in position a keeper 17 may be provided and comprises a plate surrounding the parallel members 10 of the shank, while the free end of the bolt is retained in retracted position by a similar keeper 18 disposed at the inward portion of the crook and provided with vertical pivoting flanges 19. Intermediate these flanges the trigger member 20 is pivoted by any desired means, preferably the rebent portion 21, forming a pivoting socket and having an extended finger 22 which engages the bolt when in retracted position as shown in Figure 5. The portion 21 has its pivotal bearing upon the arm 23 of a lever 24 which at its outer end is bent laterally at 25 to engage the trigger member and at its inner end is formed with an attaching portion 26 to receive a tension spring 27 which is connected at its opposite end to the finger piece 15 of the sliding bolt.

This construction provides for the formation of the trigger from a single piece of wire bent as described and the curved portion 20 thereof lies intermediate the parallel wires of the crook when the bolt is projected so as to be protected thereby and when the bolt is retracted the spring is tensioned, throwing the lever 24 downward which brings the trigger member 20 within the outline of the crook so that it is engaged by contact with the leg of the fowl to trip the finger of the trigger from its engaging relation with the free end of the bolt. The construction of the pivoting lever and its tension spring connection with the latch provides a single member forming the trigger pivot and the lever acting thereon to project the trigger into holding position when the latch is retracted.

The operation of the invention will be apparent from the foregoing description and it will be seen that this invention presents a very simple construction adapted to be formed from wire of the desired size and one in which the latch and trigger are suitably protected between the parallel wires of the shank and crook and automatically operated to retain the device in contact with the leg of the fowl when engaged therewith, so that only one hand of the operator is necessary in the catching operation.

While the details of the invention have been specifically shown and described, changes and alterations may be made therein without departing from the spirit thereof as defined in the appended claims.

Having thus described my invention, what I claim as new and desire to secure by Letters Patent of the United States, is:—

1. In a catching device, a support, a holding member slidingly mounted thereon, a controlling trigger comprising a contact device and a finger disposed to engage the projected end of said member, and tension means connecting said trigger and latch to effect joint operation thereof.

2. In a catching device, a shank provided at one end with a crook, a latch slidingly mounted on said shank, a controlling trigger for said latch, a lever member bearing upon said trigger, and tension means connecting said latch and lever for joint operation.

3. A catching device comprising a shank and crook formed of parallel members, a sliding latch mounted upon the members of the shank to be projected across the open portion of the crook, and a trigger disposed intermediate the members of the crook to engage and hold said latch in open position.

4. A catching device comprising a shank and crook formed of parallel members, a sliding latch mounted upon the members of the shank to be projected across the open portion of the crook, a trigger disposed intermediate the members of the crook to engage and hold said latch in open position, means for projecting said trigger into position for holding the retracted latch, and a tension spring extending from said means to the latch member.

5. A catching device comprising a shank and crook, a sliding latch mounted upon the shank, a trigger pivoted upon said shank and conforming to the shape of the crook and having a finger adapted to be disposed in the path of the projected end of said latch, and a tension spring extending from the trigger to the opposite end of said latch to provide joint operation thereof.

6. A catching device comprising a shank and crook, a sliding latch mounted upon the shank, a trigger pivoted upon said shank and conforming to the shape of the crook and having a finger adapted to be disposed in the path of said latch, a lever pivotally mounted upon the shank to bear upon said trigger, and a tension spring extending from said lever to the inner end of said latch.

7. In a catching device, a shank and crook formed of parallel wire members rebent at their free end and adapted at their opposite end for connection to a handle, a sliding bolt retained intermediate the wires of the shank by a keeper surrounding said wires and having a finger piece at its inner end, a trigger pivotally mounted in flanges from said keeper and provided with a finger to engage the end of the bolt when retracted, and tension means for retracting the trigger when the bolt is released.

8. In a catching device, a shank and crook formed of parallel wire members rebent at their free end and adapted at their opposite end for connection to a handle, a sliding bolt retained intermediate the wires of the shank by a keeper surrounding said wires and having a finger piece at its inner end, a trigger pivotally mounted in flanges from said keeper and provided with a finger to engage the end of the bolt when retracted, a lever extended through the flange of the keeper to form the pivot for said trigger and having an arm bearing upon the trigger, and a tension spring extending from said lever to the finger piece upon the bolt.

In testimony whereof I affix my signature.

JEROME D. JEFFERSON.